US006888806B1

(12) United States Patent
Miller et al.

(10) Patent No.: US 6,888,806 B1
(45) Date of Patent: May 3, 2005

(54) METHOD AND SYSTEM FOR SCHEDULING PACKETS FOR TRANSMISSION FROM A WIRELESS COMMUNICATION PLATFORM

(75) Inventors: Karl E. Miller, Chandler, AZ (US); George A. Mendez, Chandler, AZ (US); Aaron C. Vandegriff, Chandler, AZ (US); Kenneth J. Doerr, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 1003 days.

(21) Appl. No.: 09/721,238

(22) Filed: Nov. 22, 2000

(51) Int. Cl.[7] .............................................. H04B 7/185
(52) U.S. Cl. ....................... 370/316; 370/338; 370/349; 370/389; 370/391
(58) Field of Search ................................ 370/315, 316, 370/338, 349, 389, 391, 392

(56) References Cited

U.S. PATENT DOCUMENTS 6,501,809 B1 * 12/2002 Monk et al. ................ 375/363
6,574,237 B1 * 6/2003 Bullman et al. ............ 370/465
6,661,811 B1 * 12/2003 Baker ......................... 370/516

* cited by examiner

Primary Examiner—Dang Ton
Assistant Examiner—Inder Pal Mehra
(74) Attorney, Agent, or Firm—Frank J. Bogacz

(57) ABSTRACT

A system (38) schedules candidate packets (46) for transmission from a communication platform (22), the communication platform (22) being allocated a plurality of transmission resources (24). The system (38) includes a processing element (40) for receiving the packets (46) and establishing a transmission priority (77) for each of the packets (46) according to a desired quality of service. The packets (46) are stored in a candidate packet buffer (42) as candidate packets (48) in accordance with the established transmission priority (77). The system (38) further includes an interference resolver (44) that executes an interference resolution process (84) to concurrently consider transmission resource availability, spatial separation, and temporal separation variables when scheduling the candidate packets (48) for transmission from the communication platform (22).

30 Claims, 12 Drawing Sheets

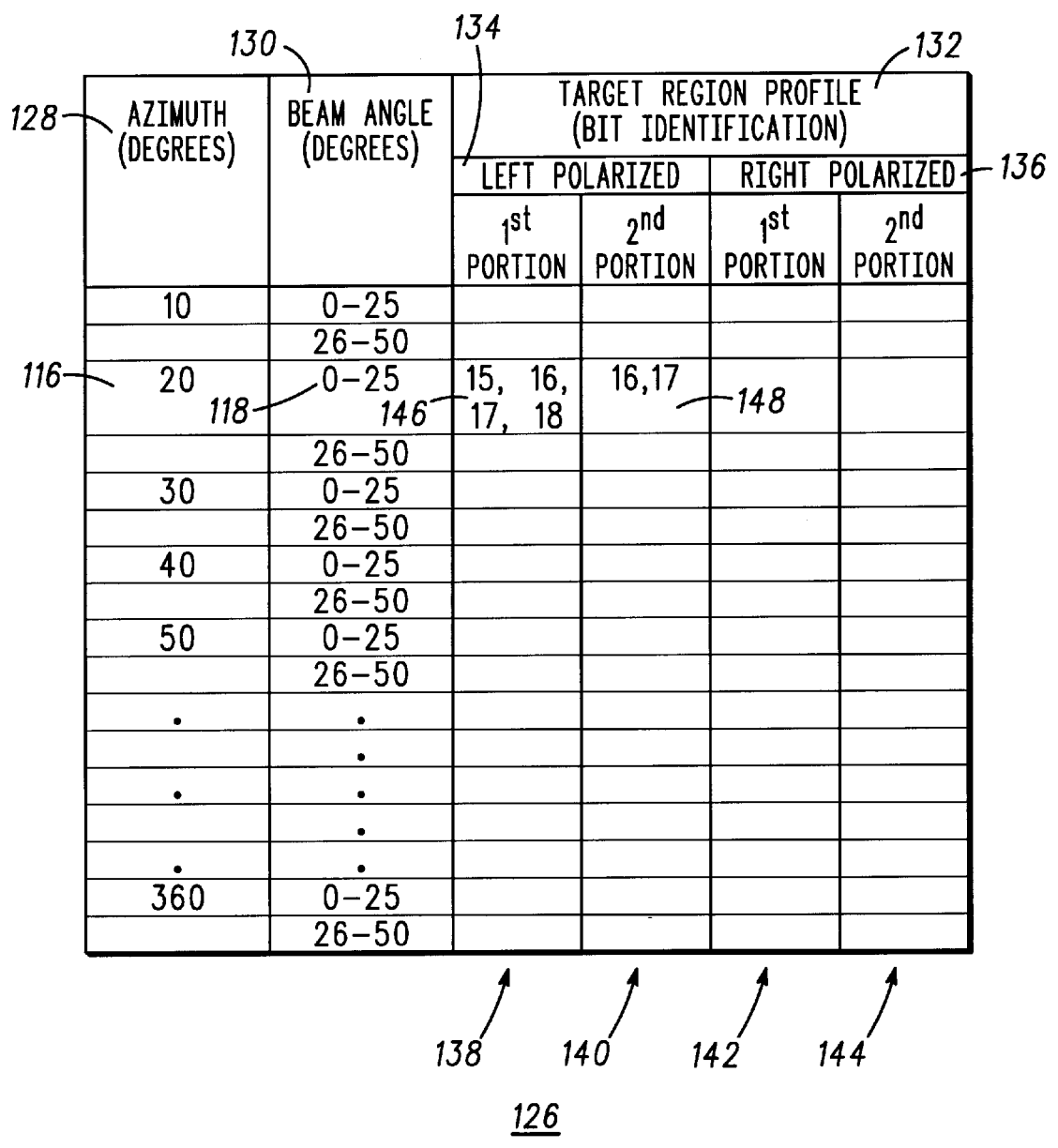

| AZIMUTH (DEGREES) | BEAM ANGLE (DEGREES) | TARGET REGION PROFILE (BIT IDENTIFICATION) | | | |
| --- | --- | --- | --- | --- | --- |
| | | LEFT POLARIZED | | RIGHT POLARIZED | |
| | | 1st PORTION | 2nd PORTION | 1st PORTION | 2nd PORTION |
| 10 | 0-25 | | | | |
| | 26-50 | | | | |
| 20 | 0-25 | 15, 16, 17, 18 | 16, 17 | | |
| | 26-50 | | | | |
| 30 | 0-25 | | | | |
| | 26-50 | | | | |
| 40 | 0-25 | | | | |
| | 26-50 | | | | |
| 50 | 0-25 | | | | |
| | 26-50 | | | | |
| ⋮ | ⋮ | | | | |
| 360 | 0-25 | | | | |
| | 26-50 | | | | |

FIG. 7

|  | LEFT POLARIZATION 90 | | | RIGHT POLARIZATION 92 | | |
|---|---|---|---|---|---|---|
| BIT ID | KEEP OUT REGION BITMAPS (A) | TARGET REGION BITMAPS (B) | OUTPUT OF AND GATES (Y) | KEEP OUT REGION BITMAPS (C) | TARGET REGION BITMAPS (D) | OUTPUT OF AND GATES (Z) |
| 1 | 0 | 0 | 0 | 0 | 0 | 0 |
| 2 | 0 | 0 | 0 | 0 | 0 | 0 |
| 3 | 0 | 0 | 0 | 0 | 0 | 0 |
| 4 | 0 | 0 | 0 | 0 | 0 | 0 |
| 5 | 0 | 0 | 0 | 0 | 0 | 0 |
| 6 | 0 | 0 | 0 | 0 | 0 | 0 |
| 7 | 0 | 0 | 0 | 0 | 0 | 0 |
| 8 | 0 | 0 | 0 | 0 | 0 | 0 |
| 9 | 0 | 0 | 0 | 0 | 0 | 0 |
| 10 | 0 | 0 | 0 | 0 | 0 | 0 |
| 11 | 0 | 0 | 0 | 0 | 0 | 0 |
| 12 | 0 | 0 | 0 | 0 | 0 | 0 |
| 13 | 0 | 0 | 0 | 0 | 0 | 0 |
| 14 | 0 | 0 | 0 | 0 | 0 | 0 |
| 15 | 0 | 1 | 0 | 0 | 0 | 0 |
| 16 | 0 | 1  156 | 0 | 0 | 1  158 | 0 |
| 17 | 0 | 1 | 0 | 0 | 1 | 0 |
| 18 | 0 | 1 | 0 | 0 | 0 | 0 |
| 19 | 0 | 0 | 0 | 0 | 0 | 0 |
| 20 | 0 | 0 | 0 | 0 | 0 | 0 |
| 21 | 0 | 0 | 0 | 0 | 0 | 0 |
| 22 | 0 | 0 | 0 | 0 | 0 | 0 |
| 23 | 0 | 0 | 0 | 0 | 0 | 0 |
| 24 | 0 | 0 | 0 | 0 | 0 | 0 |
| . | . | . | . | . | . | . |
| . | . | . | . | . | . | . |
| . | . | . | . | . | . | . |
| nn | 0 | 0 | 0 | 0 | 0 | 0 |

| | LEFT POLARIZATION 90 | | | RIGHT POLARIZATION 92 | | |
|---|---|---|---|---|---|---|
| BIT ID | KEEP OUT REGION BITMAPS (A) | TARGET REGION BITMAPS (B) | OUTPUT OF AND GATES (Y) | KEEP OUT REGION BITMAPS (C) | TARGET REGION BITMAPS (D) | OUTPUT OF AND GATES (Z) |
| 1 | 1 ⎫ | 0 | 0 | 0 | 0 | 0 |
| 2 | 1 ⎬ 37 | 0 | 0 | 1 ⎫ 37 | 0 | 0 |
| 3 | 1 ⎬ | 0 | 0 | 1 ⎭ | 0 | 0 |
| 4 | 1 ⎭ | 0 | 0 | 0 | 0 | 0 |
| 5 | 0 | 0 | 0 | 0 | 0 | 0 |
| 6 | 0 | 0 | 0 | 0 | 0 | 0 |
| 7 | 0 | 0 | 0 | 0 | 0 | 0 |
| 8 | 0 | 0 | 0 | 0 | 0 | 0 |
| 9 | 0 | 1 ⎫ | 0 | 1 ⎫ | 0 | 0 |
| 10 | 1 ⎫ | 1 ⎬ 206 | 1 | 1 ⎬ 37 | 1 ⎫ 214 | 1 |
| 11 | 1 ⎬ 37 | 1 ⎬ | 1 | 1 ⎬ | 1 ⎭ | 1 |
| 12 | 1 ⎭ | 1 ⎭ | 1 | 1 ⎭ | 0 | 0 |
| 13 | 0 | 0 | 0 | 0 | 0 | 0 |
| 14 | 0 | 0 | 0 | 0 | 0 | 0 |
| 15 | 1 ⎫ | 0 | 0 | 0 | 0 | 0 |
| 16 | 1 ⎬ 37 | 0 | 0 | 0 | 1 ⎫ 37 | 0 |
| 17 | 1 ⎬ | 0 | 0 | 0 | 1 ⎭ | 0 |
| 18 | 1 ⎭ | 0 | 0 | 0 | 0 | 0 |
| 19 | 0 | 0 | 0 | 0 | 0 | 0 |
| 20 | 0 | 0 | 0 | 0 | 0 | 0 |
| 21 | 1 ⎫ | 0 | 0 | 0 | 0 | 0 |
| 22 | 1 ⎬ 37 | 0 | 0 | 0 | 0 | 0 |
| 23 | 1 ⎭ | 0 | 0 | 0 | 0 | 0 |
| 24 | 0 | 0 | 0 | 0 | 0 | 0 |
| ... | ... | ... | ... | ... | ... | ... |
| nn | 0 | 0 | 0 | 0 | 0 | 0 |

METHOD AND SYSTEM FOR SCHEDULING PACKETS FOR TRANSMISSION FROM A WIRELESS COMMUNICATION PLATFORM

TECHNICAL FIELD OF THE INVENTION

The present invention relates to the field of wireless communication platforms. More specifically, the present invention relates to scheduling packets for transmission from a wireless communication platform.

BACKGROUND OF THE INVENTION

Wireless communication platforms, for example, communications satellite systems, are transitioning from point-to-point high-capacity trunk communications between large, costly ground terminals to multipoint-to-multipoint communications between small, low-cost ground stations. The development of multiple access techniques has facilitated this transition. Using a multiple access technique, independent signals can be combined on a communication channel at a transmitter and split up at a receiver by a demultiplexer. The communication channel may be shared between the independent signals in one of several different ways, such as time division multiplexing, frequency division multiplexing, and code division multiplexing, or a combination thereof.

A multiple access technique known as frequency reuse allows a communication platform to communicate with a number of these ground stations using the same frequency, i.e., communication channel, by simultaneously transmitting packets of information over a finite number of steerable beams pointed toward each of the ground stations. Since each of the beams is operating at the same frequency, the beams cannot be allowed to illuminate the same region of the earth at the same time. If the beams do illuminate the same region at the same time, i.e., the beams overlap, interference between beams can occur. Unfortunately, the overlapping signals may illuminate unintended receivers and may interfere with their signal reception.

Beam interference may be due to the level of radiated energy outside of the regions the beams are intended to illuminate. The amount and direction of this overflow of radiated energy is in turn due to planned and unplanned consequences. In a satellite-based communication platform, some of these consequences can include oversizing of the beam to accommodate continuous satellite motion, beam shape changes due to beam angles (i.e., beam shape changes from circular to elliptical based on beam angle relative to nadir), beam shape changes due to thermal and aging factors in the transmission equipment, and time varying changes relative to the attitude angles of a satellite.

The problem of beam interference may be mitigated or prevented by effective transmission resource allocation strategies. An effective transmission resource allocation strategy is one in which, packets of data to be transmitted from a communication platform are scheduled for transmission in a time and resource efficient manner, while concurrently avoiding circumstances in which interference between transmissions from two or more beams could occur. When attempting to mitigate the problem of beam interference, communication platforms typically consider four variables for each transmitted packet. These four variables include quality of service (QOS), spatial separation, time separation, and transmission resource assignment.

The QOS is a measure of the quality of the communication service provided to a subscriber and may be quantitatively indicated by system performance parameters such as signal to noise ratio, bit error ratio, message throughput rate, call blocking probability, and so forth. QOS is a crucial variable in the processing of a packet because QOS drives system performance. That is, certain data packets may demand a higher QOS than other data packets. For example, realtime voice and video communication are highly intolerant of latency, or transmission delays within the network, and may demand a higher QOS. In contrast, non-realtime data files can tolerate some transmission delay and a lower QOS in terms of latency.

Spatial separation indicates the physical separation requirements, with respect to the earth, between individual beams to prevent beam interference. Time separation indicates the separation in time between the transmission of packets. Transmission resource assignment indicates the allocation of a particular beam for transmission of a packet. In order to effectively schedule packets for transmission, all four of these variables should be considered.

One prior art method for packet transmission scheduling is a four variable processing for a common queue technique. In other words, packets are scheduled to transmission resources by concurrently considering QOS, spatial separation, time separation; and transmission resource availability. Unfortunately, such processing is extremely complex and requires significant and costly realtime processing capability.

Another prior art method for packet transmission scheduling is an individual beam resource queue technique. In such a technique, packets are allocated to particular transmission resources in a first processing stage. QOS and time separation are then considered in a second stage of processing. Spatial separation is considered in a final processing stage. While the complexity of the processing is somewhat reduced from the first prior art technique by separating the processing of the variables into three stages, the final processing stage is performed iteratively which undesirably increases the processing time, cost, complexity.

Accordingly, what is needed is an efficient packet scheduling method and system for solving multiple variable resource allocation problems in a wireless communication platform. Furthermore, what is needed is a packet scheduling method and system which consider QOS as the highest priority of the processing variables.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 7 shows a table of an exemplary profile database;

FIG. 9 shows a table of interference calculations performed by an interference calculator of the system of FIG. 3;

FIG. 12 shows a table of interference calculations performed by the interference calculator of the system of FIG. 3.

DETAILED DESCRIPTION OF THE PREFERRED EMBODIMENTS

Figure 1:
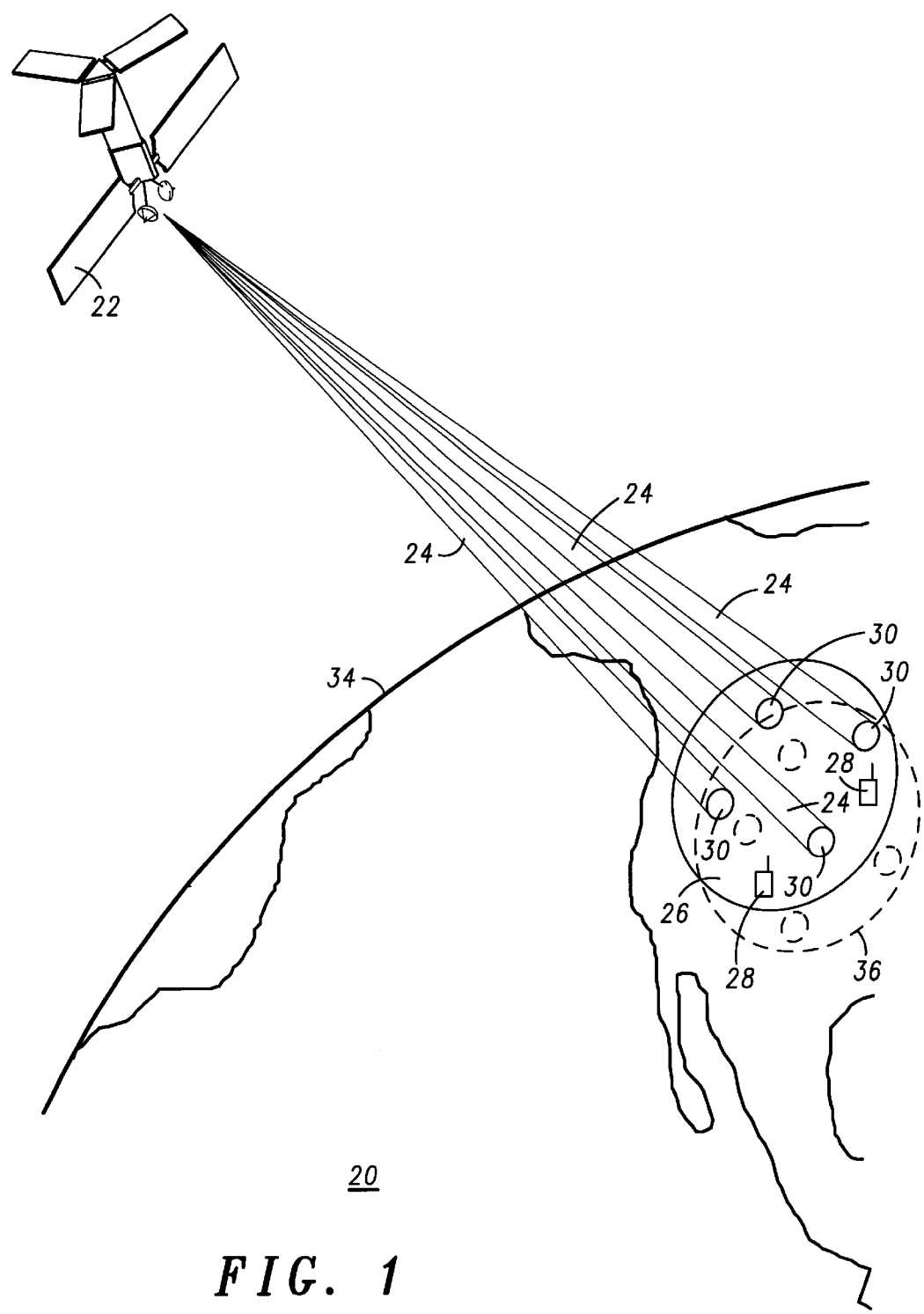
FIG. 1 shows a simplified block diagram of a wireless communication network in which a communication platform is transmitting using transmission resources.

FIG. 1 shows a simplified block diagram of a wireless communication network 20 in which a communication platform 22 is transmitting using transmission resources 24. The transmission of information using transmission resources 24 is limited to a field of view (FOV) 26 for communication platform 22. That is, FOV 26 defines a radio coverage area for communication platform 22.

Communication platform 22 employs a frequency reuse technique that allows communication platform 22 to simultaneously deliver information to a number of ground stations 28 using the same frequency range (for example, 18.8–19.3 GHz) over a finite number of transmission resources 24. Transmission resources 24 are narrow transmission beams that may be pointed, or steered, to particular ground stations 28 within FOV 26 of communication platform 22. Beam widths of transmission resources 24 may be adjusted to cover desired beam footprints 30, or coverage areas, within FOV 26. Thus, ground stations 28 located in two different ones of beam footprints 30 are illuminated by different transmission resources 24 and can receive different information transmitted on the same frequency from communication platform 22.

In an exemplary embodiment, communication platform 22 employs a circular antenna system (not shown). The circular antenna system is a folded dipole antenna bent into a circle. A circular antenna system produces left and right hand cross polarization. The left and right hand cross polarizations represent the three dimensional configuration of the electromagnetic radiation emitted from the circular antenna. In right hand cross polarization, the energy radiates from the top of the circular antenna and then around a circle clockwise terminating at the top again to produce an electromagnetic spiral radiation pattern in space. In left hand polarization, the energy radiates from the top and then around a circle counterclockwise. Hence, some of transmission resources 24 may be left polarized and others of transmission resources 24 may be right polarized.

Left and right hand cross polarization provides polarization diversity discrimination between transmission resources 24. In other words, left polarized ones of transmission resources 24 are first discriminators that are ninety degrees out of phase relative to right polarized ones of transmission resources 24, or second discriminators. In an ideal environment, left polarized ones of transmission resources 24 may be considered to be distinct communication channels from right polarized ones of transmission resources 24.

However, in an actual environment left and right polarized ones of transmission resources 24 are not completely independent. That is, a left polarized one of transmission resources 24 transmitting over one of beam footprints 30 within FOV 26 may interfere with a right polarized one of transmission resources 24 transmitting in the vicinity of the particular one of beam footprints 30 within FOV 26. Although there may be some interference between left and right polarized ones of transmission resources 24, the interference is small. If appropriately managed, this potential source of interference can be prevented with the gain being a second communication channel.

The present invention uses left and right polarized ones of transmission resources 24 as first and second discriminators. However, it should be understood that transmission resources may be transmitting over more than one frequency, such as in a frequency division multiplexing multiple access technique. As such, a first discriminator may be a first transmission frequency and a second discriminator may be a second transmission frequency. Moreover, in a frequency division multiplex (FDM) system, there are likely to be more than two discriminators. That is, there would be N discriminators for N transmission frequencies employed in the FDM system.

In an exemplary embodiment, communication platform 22 is a Non-Geosychronous (Non-GEO) communication satellite, such as a Low Earth Orbit (LEO) or a Middle Earth Orbit (MEO) satellite. As such, a first location 32 of FOV 26 relative to earth 34 is represented by a solid oval at a first instant. A second location 36 of FOV 26 relative to earth 34 is represented at a second instant by a dashed oval to illustrate the movement of satellite 22 about earth 34.

Although the present invention is described in terms of a Non-GEO satellite, it should be understood that in alternative embodiments, communication platform may be a Geosynchronous (GEO) satellite, a terrestrial base station, and the like. In addition, wireless communication network 20 is shown with a single communication platform 22 having a single field of view (FOV) 26 for simplicity of illustration. However, it should be readily apparent to those skilled in the art that wireless communication network 20 includes many more satellites, terrestrial base stations, or a combination of both satellites and base stations for providing world-wide or near world-wide radio communication services.

Communication platform 22 transmits packets of data (not shown) using transmission resources 24. Each packet typically includes overhead information and payload. The overhead information includes, for example, synchronizing bits, address of the packet destination, address of the originating device, length of packet, and so forth. The payload is a user-provided data unit the transmission of which is the object of communication platform 22. The payload is reassembled in response to the overhead information by a receiving one of ground stations 28 into the original signal.

Figure 2:
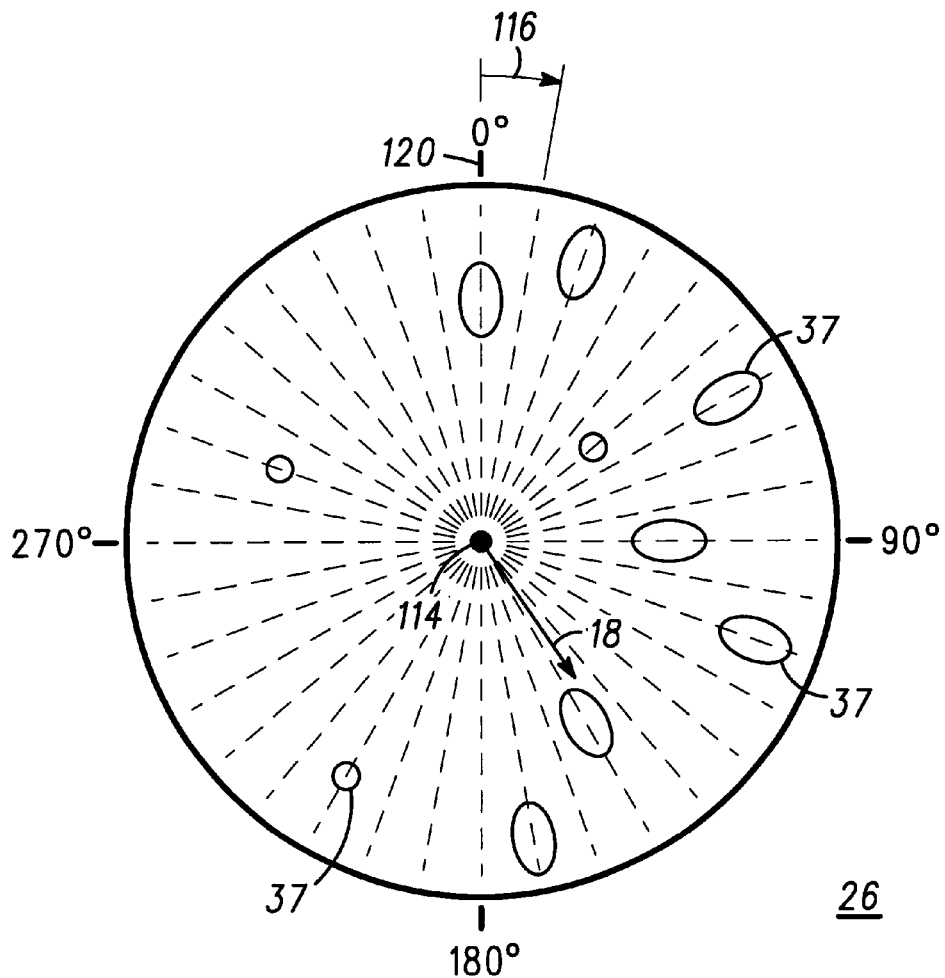
FIG. 2 shows a diagram of an exemplary field of view for the communication platform.

FIG. 2 shows a diagram of an exemplary field of view (FOV) 26 for communication platform 22 (FIG. 1). FOV 26 is shown having keep out regions 37. Keep out regions 37 are keep out region bitmaps that simulate beam footprints 30 (FIG. 1), or illumination regions around desired packet destinations, of those of transmission resources (FIG. 1) transmitting data packets during a transmit time frame (discussed below).

The present invention efficiently schedules data packets for transmission from communication platform 22 by "filtering" those packets whose destination might result in interference between two or more of transmission resources 24. This "filtering" is performed using a graphical processing technique, or engine, that prevents keep out regions 37 from overlapping one another when scheduling packets for data transmission during a transmit time frame using transmission resources 24.

Figure 3:
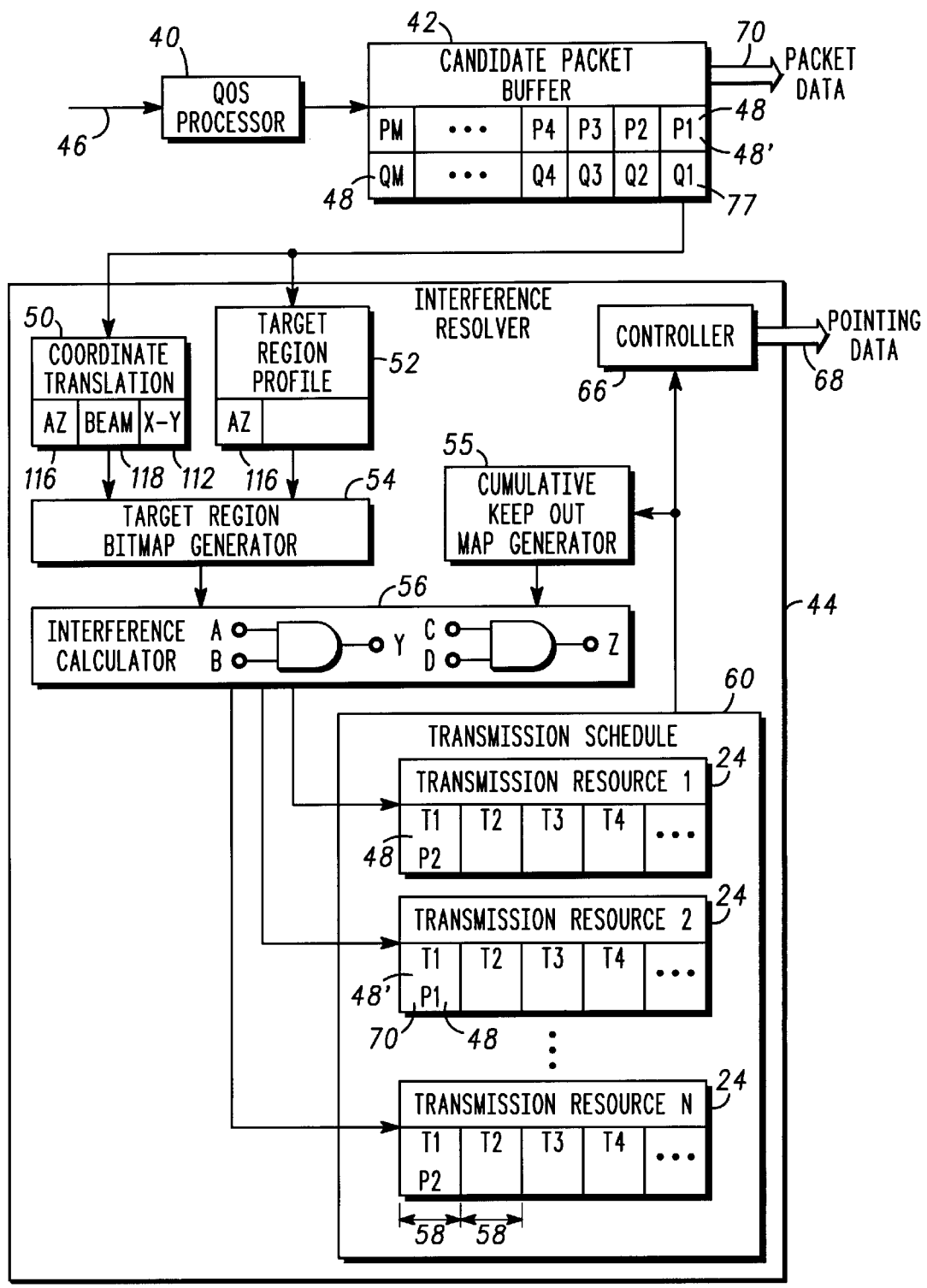
FIG. 3 shows a block diagram of a system for scheduling packets for transmission from the communication platform of FIG. 1.

FIG. 3 shows a block diagram of a system 38 for scheduling packets for transmission from communication platform 22 (FIG. 1). System 38 is located in communication platform 22 and functions to efficiently consider quality of service (QOS), spatial separation, time separation, and transmission resource assignment variables when scheduling packets for transmission from communication platform 22.

Generally, system 38 includes a quality of service (QOS) processor 40, a candidate packet buffer 42 in communication with QOS processor 40, and an interference resolver 44 in communication with candidate packet buffer 42. QOS processor 40 is configured to receive data in the form of packets 46 from a packet switch (not shown) of communication platform 22 via a main packet queue (not shown). Packets 46 are provided by QOS processor 40 and are stored in, or inserted into, free spaces in candidate packet buffer 42 as candidate packets 48 in accordance with their designated transmission priorities (discussed below).

Interference resolver 44 includes a coordinate translation element 50 and a target region profile element 52 both of which are in communication with candidate packet buffer 42. Outputs of coordinate translation element 50 and target region profile element 52 in turn are in communication with a target region bitmap generator 54. Likewise, target region bitmap generator 54 is in communication with an interference calculator 56. In addition, a cumulative keep out map generator 55 is in communication with interference calculator 56.

Interference resolver 44 functions to tentatively schedule candidate packets 48 in one of transmission resources 24 during a particular transmit time frame 58. Interference calculator 56 evaluates the tentatively scheduled one of candidate packets 48 in terms of spatial separation. That is, interference calculator 56 verifies that a target region bitmap (discussed below) for the tentatively scheduled one of candidate packets 48 does not overlap keep out regions 37 (FIG. 2). If all of the scheduling constraints are met, the tentatively scheduled one of candidate packets 48 is scheduled for transmission during the particular transmit time frame 58 using the one of transmission resources 24. Accordingly, outputs of interference calculator 56 are input into a transmission schedule table 60.

In an exemplary embodiment, transmission schedule table 60 is subdivided into sections defined by each of transmission resources 24 and transmit time frames 58. For example, transmission schedule table 60 includes data entries for each of N transmission resources 24. A number of transmission resources 24 allocated to communication platform 22 (FIG. 1) is system dependent. However, in a preferred embodiment, the number of transmission resources 24 allocated to communication platform 22 is eighteen. Data entries for each of transmission resources are subdivided into consecutive transmit time frames 58, labeled T1, T2, T3, T4, and so forth. A duration of transmit time frame 58 is system dependent. However, in a preferred embodiment, the duration of each transmit time frame 58 is approximately two microseconds.

A controller 66 of interference resolver 44 accesses transmission schedule table 60 to compute pointing data 68 used to steer transmission beams 24 for each of the scheduled ones of candidate packets 48 during each transmit time frame 58. Candidate packets 48 are subsequently output from candidate packet buffer 42 as scheduled packets 70 in response to transmission schedule table 60.

In a preferred embodiment, interference resolver 44 of system 38 is implemented in hardware as a digital application specific integrated circuit (ASIC) used to perform a set of specific functions. By using this hardware configuration, spatial separation, time separation, and transmission resource assignment variables can be resolved in a single clock cycle of the digital ASIC circuitry during a duration of transmit time frame 58 utilizing parallel binary operations. The following discussion, in combination with a flow of tasks illustrated in FIGS. 4 and 5, will describe the functions performed by system 38.

Figure 4:
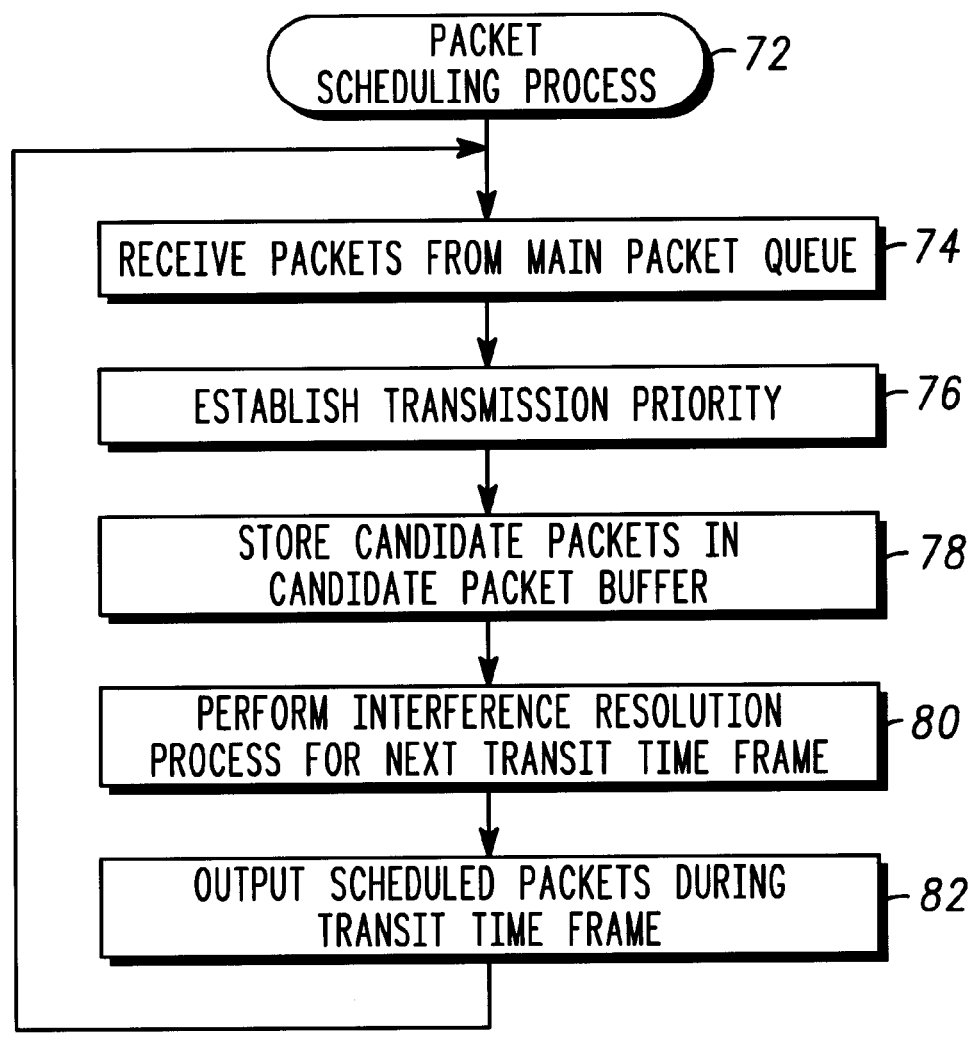
FIG. 4 shows a flow chart of a packet scheduling process performed by the system of FIG. 3.

FIG. 4 shows a flow chart of a packet scheduling process 72 performed by system 38 (FIG. 3). Packet scheduling process 72 is performed by system 38 to schedule received ones of packets 46 (FIG. 3) for transmission from communication platform 22 (FIG. 1) as scheduled packets 70 (FIG. 3) during transmit time frame 58 in an efficient and contention free manner. Through the execution of process 72, candidate packets 48 will desirably be assigned to all of transmission resources 24 during a scheduling duration for transmit time frame 58, the scheduling duration being substantially equivalent to a duration of transmit time frame 58.

Process 72 begins with a task 74. At task 74, QOS processor 40 (FIG. 3) receives packets 46 from a packet switch (not shown) of communication platform 22 via a main packet queue (not shown). In response to task 74, a task 76 is performed.

At task 76, QOS processor 40 establishes transmission priorities for received ones of packets 46. Each of packets 46 has a unique identification and each of packets 46 carries its own packet destination address. Therefore, each of packets 46 is independent, with multiple packets 46 in a stream of packets 46 often traversing wireless communication network 20 (FIG. 1) from originating packet switches to their destinations by different routes. Since packets 46 may follow different physical paths of varying lengths, they may experience varying levels of propagation delay, also known as latency. In addition, packets 46 may encounter varying levels of delay as they are held in packet buffers awaiting the availability of a subsequent communication channel. Finally, packets 46 may be acted upon by varying numbers of packet switches as they are transmitted through wireless communication network 20, with each switch accomplishing the process of error detection and correction. As a result, packets 46 may arrive at one of mobile stations 28 (FIG. 1) in a different order than they were presented to wireless communication network 20. Some packets 46 may be able to tolerate longer transmission delay than others of packets 46. For example, realtime voice and video are delay intolerant while non-realtime data transfer can tolerate some delay.

Accordingly, task 76 causes QOS processor 40 to establish a transmission priority 77 (FIG. 3) for each of packets 46 in response to a determined data type of each of packets 46 and a desired quality of service for each of packets 46 relative to the data type. QOS processing is performed prior to considering the other variables of spatial separation, time separation, and transmission resource assignment to ensure that the desired QOS of one of packets 44 is treated with a higher priority than the other transmission variables.

A specific QOS based packet prioritization algorithm to be executed at QOS processor 40 is dependent upon the system application. One exemplary QOS packet prioritization algorithm may determine data types (for example, realtime voice, videoconferencing, multimedia, non-realtime data) of the payloads of each of packets 46 received at QOS processor 40. The QOS algorithm may then designate transmission priority 77 for each of packets 46 in response to the data types.

The object of the QOS algorithm executed by QOS processor 40 is to preselect a specific number of packets 46 which must be transmitted in a coarse specific order in order to satisfy QOS requirements. However, it will become readily apparent that these packets 46 may be interchanged in time within an allowable transmission time delay period and may be allocated to various transmission resources 24 (FIG. 1) as needed.

That is, the present invention advantageously exploits a quality of service transmission priority implemented to establish the allowable transmission time delay period. The allowable transmission time delay period encompasses a number of potential transmit time frames during which one of packets 46 may be scheduled to prevent violation of its transmission priority 77. As such, the present invention permits changes in packet ordering in smaller increments of the allowable time delay without violating the original transmission priority. The allowance of small changes in packet ordering results in many more possible combinations of packet assignments to transmission resources with regards to spatial and time separation, thus yielding higher utilization of transmission resources than conventional quality of service based approaches.

A task 78 is performed in response to task 76. Task 78 causes QOS processor 40 to store packets 46 as candidate packets 48 (FIG. 3) in candidate packet buffer 42 in accordance with their designated transmission priority 77. For example, one of candidate packets 48, labeled P1, may have a higher transmission priority 77 than candidate packets 48, labeled P2 through Pm.

Candidate packet buffer 42 has a predetermined and finite packet buffer depth. The depth of candidate packet buffer 42 is related to a quantity of transmission resources 24 (FIG. 3) of communication platform 22 (FIG. 2) to which candidate packets 48 are to be assigned. Accordingly, candidate packet buffer 42 should store as a minimum, a quantity of candidate packets 48 equivalent to the quantity of transmission resources 24 (FIG. 1). However, in a preferred embodiment, the depth of candidate packet buffer 42 may be optimized to include enough candidate packets 48 such that if one of candidate packets 48 cannot be scheduled for transmission during transmit time frame 58, another one of candidate packets 48 may be selected. In an exemplary embodiment, communication platform 22 (FIG. 1) is allocated eighteen transmission resources 24. Hence, the depth of candidate packet buffer 42 may be optimized to store, for example, thirty candidate packets 48.

A task 80 is performed in response to task 78. At task 80, interference resolver 44 (FIG. 3) performs an interference resolution process (discussed below) for a next transmit time frame 58 (FIG. 3). In other words, interference resolver 44 assesses candidate packets 48 in accordance with their associated transmission priority 77. Interference resolver 44 resolves contention in spatial separation, time separation, and transmission resource assignment in order to schedule candidate packets 48 for transmission.

In order to accomplish task 80, interference resolver 44 performs parallel processing of three variables (namely transmission resource allocation, time separation, and spatial separation) while performing packet sequential processing for the multiple transmission resources 24 (FIG. 1). This results in an efficient packet scheduling algorithm whose processing performance is approximately two hundred and seventy times better than conventional algorithms. The gain in processing performance is attributed to placing the processing of the three variables in parallel while allowing this parallel processing to be in series with a recursive process of scheduling candidate packets to the multiple transmission resources 24.

Following performing task 80, packet scheduling process 72 proceeds to a task 82. At task 82, scheduled packets 70 (FIG. 3) are output from candidate packet buffer 42 and their associated pointing data 68 (FIG. 3) is provided from controller 66 (FIG. 3). Scheduled packets 70 and pointing data 68 are provided to a downlink modulator and beamformer element (not shown) of communication platform 22 (FIG. 1) for subsequent transmission according to transmission schedule table 60.

Packet scheduling process 72 operates continuously as represented by a program control loop from task 82 back to task 74. That is, QOS processor 40 (FIG. 3) continuously receives packets 46 (FIG. 3), establishes each respective transmission priority 77 (FIG. 3), and stores packets 46 as candidate packets 48 (FIG. 3) in candidate packet buffer 42 (FIG. 3). In addition, interference resolver 44 continuously assesses candidate packets 48 and resolves contention in spatial separation, time separation, and transmission resource assignment in order to schedule candidate packets 48 for transmission as scheduled packets 70 (FIG. 3).

Figure 5:
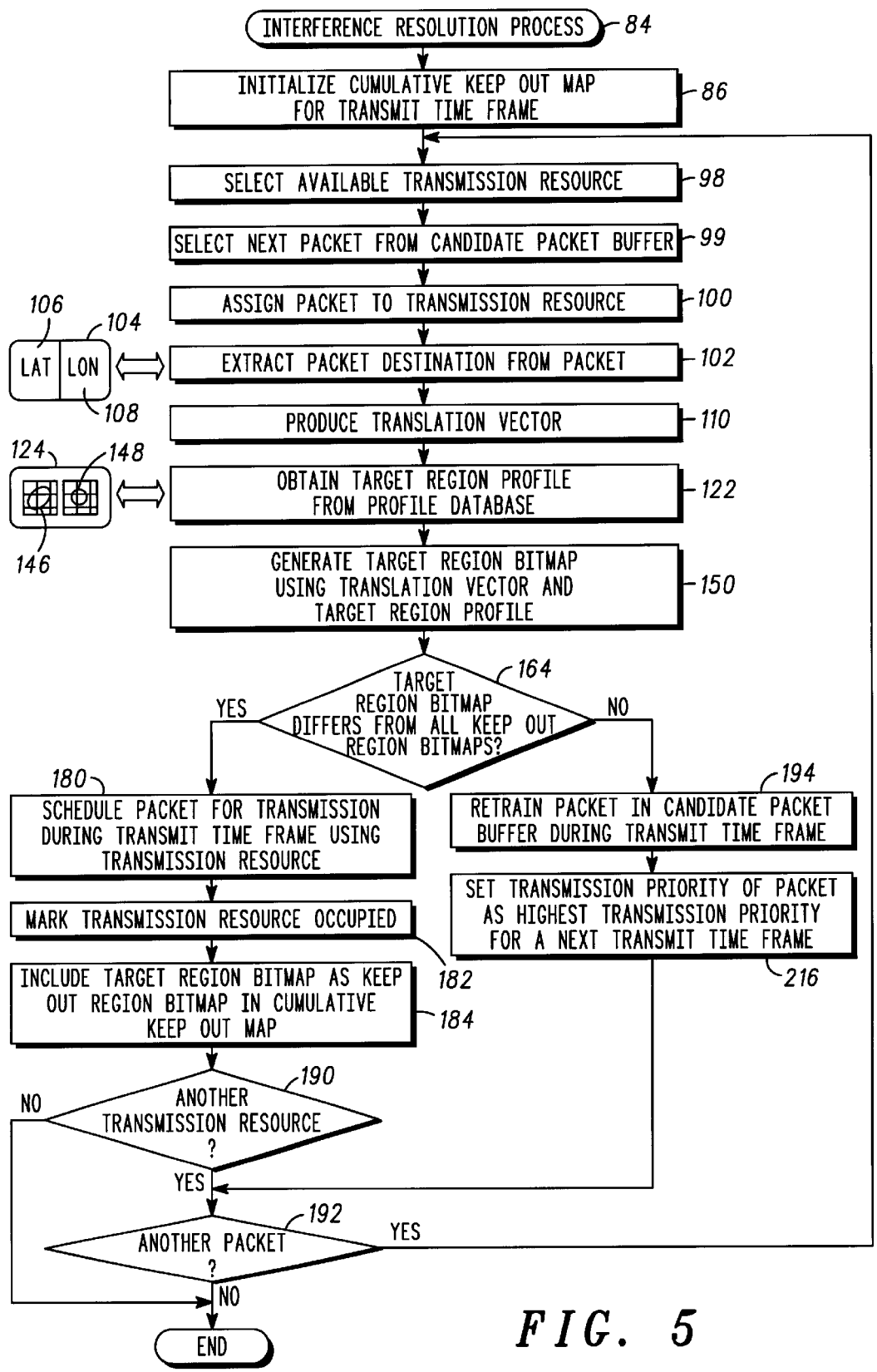
FIG. 5 shows a flow chart of an interference resolution process performed by an interference resolver of the system of FIG. 3.

FIG. 5 shows a flow chart of an interference resolution process 84 performed by interference resolver 44 (FIG. 3) of system 38 (FIG. 3). Interference resolution process 84 is executed at task 80 (FIG. 4) of packet scheduling process 72 (FIG. 4) for each transmit time frame 58 (FIG. 3). Interference resolution process 84 begins with a task 86.

At task 86, cumulative keep out map generator 55 (FIG. 3) initializes a cumulative keep out map for transmit time frame 58 (FIG. 3).

Figure 6:
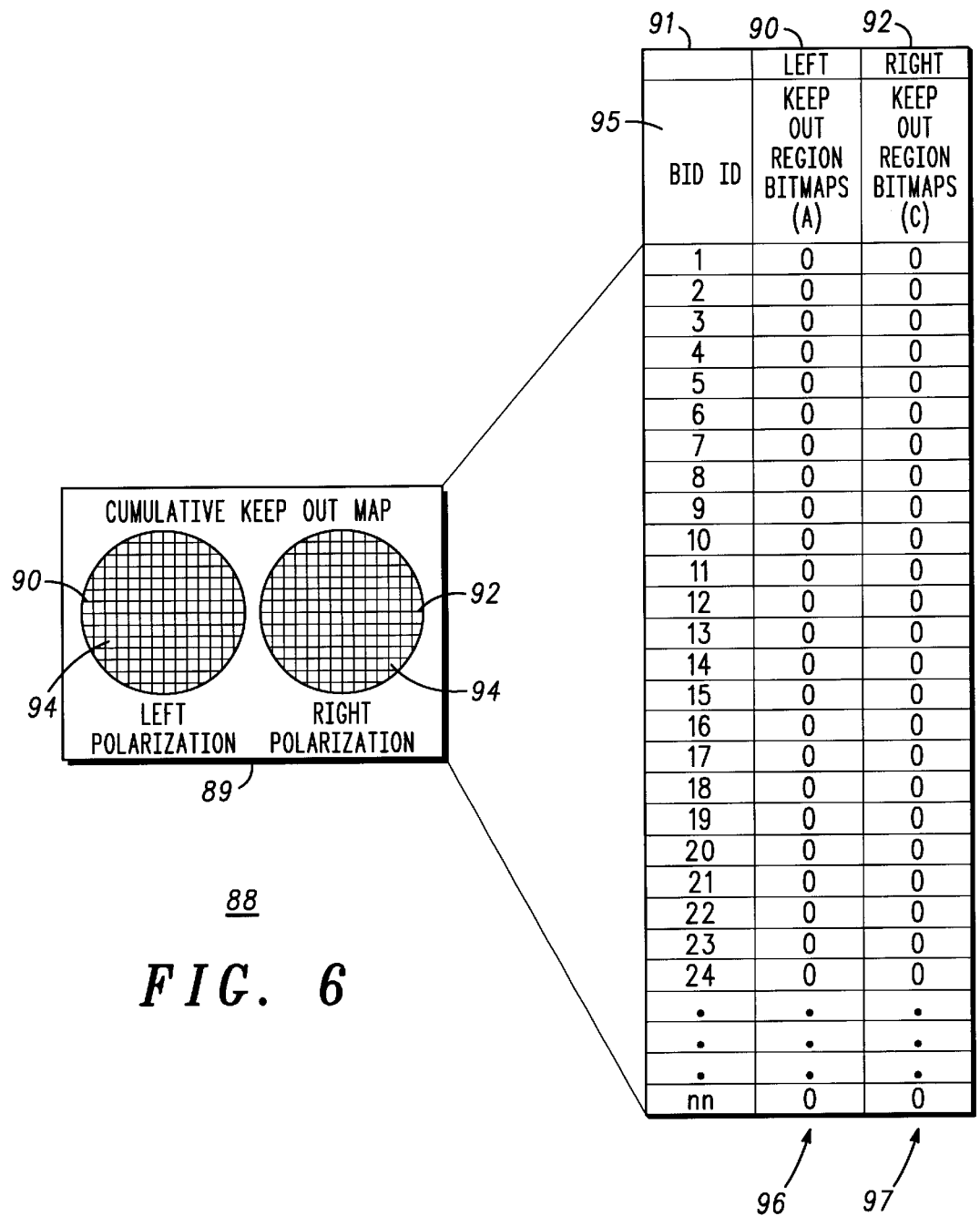
FIG. 6 shows a diagram of an exemplary cumulative keep out map.

Referring to FIG. 6 in connection with task 86, FIG. 6 shows a diagram of an exemplary cumulative keep out map 88 initialized at task 86. For clarity of discussion, cumulative keep out map 88 shows a graphical representation 89 and a tabular representation 91 of FOV 26 (FIG. 1) of communication platform 22 (FIG. 1) at transmit time frame 58 (FIG. 3).

Cumulative keep out map 88 is used to assign candidate packets 48 to transmission resources 24 and evaluate those assignments in terms of spatial separation. Cumulative keep out map 88 is initialized for each transmit time frame 58 (FIG. 3) and is used through the following iterative tasks of interference resolution process 84 (FIG. 5). The evaluation of spatial separation is performed by mapping keep out regions 37 (FIG. 2) as bitmaps into cumulative keep out map 88. The mapped ones of keep out regions 37 correspond to particular beam footprints 30 (FIG. 1) illuminating earth 34 (FIG. 1) around a packet destination of scheduled packets 70 (FIG. 3) scheduled for transmission during transmit time frame 58. Thus, cumulative keep out map 88 is a graphical representation of spatial separation, or distance, between beam footprints 30 of transmission resources 24.

As discussed previously, some of transmission resources 24 (FIG. 1) may be left polarized and others of transmission resources 24 may be right polarized. In order to manage the potential interference between left and right hand polarized ones of transmission resources 24, cumulative keep out map 88 is initialized to include a first keep out map 90 representing a left polarization beam pattern and a second keep out map 92 representing a right polarization beam pattern. Keep out regions 37 (FIG. 2) will be mapped into first and second keep out maps 90 and 92, respectively, to track the potential interference between left and right hand polarized ones of transmission resources 24.

First keep out map 90 and second keep out map 92 of cumulative keep out map 88 are subdivided into a plurality of bits 94 identified by bit identifiers 95 in tabular representation 91. Each of bits 94, identified using bit identifiers 95, represents a region within FOV 26 (FIG. 1) of communication platform 22 (FIG. 1) during transmit time frame 58 (FIG. 3). Thus, bit identifiers 95 may be associated with coordinates, such as latitude and longitude. In an exemplary embodiment, each of bits 94 may represent a region in FOV 26 of approximately fifty square kilometers.

Tabular representation 91 shows a first column 96 of bit settings for first keep out map 90 and a second column 97 of bit settings for second keep out map 92. Since cumulative keep out map 88 is being initialized at task 86 for transmit time frame 58, tabular representation 91 shows bit settings in each of first and second columns 96 and 97 all of which are initialized to "zero". This indicates that, as of yet, no candidate packets 48 have been scheduled for transmission as scheduled packets 70 (FIG. 3) during transmit time frame 58. A bit setting of "one" in either of first column 96 and second column 97 indicates that the region represented by bit identifier will be illuminated by another of transmission resources 24 (FIG. 1) during transmit time frame 58. Thus, bit settings of "one" in first column 96 and in second column 97 identify keep out regions 37 (FIG. 2).

With reference back to interference resolution process 84 (FIG. 5), following task 86, a task 98 is performed. At task 98, interference resolver 44 (FIG. 3) selects an available one of transmission resources 24 (FIG. 1). An available one of transmission resources 24 is a transmission beam allocated to communication platform 22 (FIG. 1) that is not otherwise assigned to transmit another one of candidate packets 48 (FIG. 3). Of course, it should be readily apparent that during a first iteration of interference resolution process 84, all of transmission resources 24 are likely to be available. Interference resolver 44 may select one of transmission resources 24 in response to a predetermined listed order as directed by a pointer (not shown) to transmission resources 24. Referring momentarily to FIG. 3, interference resolver 44 may select, for example, one of transmission resources 24, labeled "TRANSMISSION RESOURCE 2" from transmission schedule table 60.

Referring back to interference resolution process 84 (FIG. 5), once one of transmission resources 24 is selected at task 98, a task 99 is performed. At task 99, interference resolver 44 selects a next one of candidate packets 48 (FIG. 3) from candidate packet buffer 42 (FIG. 3). Interference resolver 44 selects one of candidate packets 48 by determining which of candidate packets 48 has a higher transmission priority 77 (FIG. 3) than remaining ones of candidate packets 48. In addition to transmission priority 77, interference resolver 44 selects candidate packets 48 in accordance with an oldest out first algorithm so that those of candidate packets 48 (FIG. 3) that have been in candidate packet buffer 42 the longest are scheduled for transmission prior to incoming ones of candidate packets 48. In an exemplary scenario, selection task 99 selects a first candidate packet 48', labeled P1.

In response to tasks 98 and 99, a task 100 is performed. At task 100, interference resolver 44 tentatively assigns first candidate packet 48' to the selected one of transmission resources 24, labeled "TRANSMISSION RESOURCE 2".

Following task 100, interference resolver 44 performs a task 102. At task 102, interference resolver 44 extracts a packet destination 104 from the header of candidate packet 48'. Packet destination 104 is a geographic location address found in the header of candidate packet 48' that describes where candidate packet 48' is to be transmitted for receipt by a particular one of ground stations 28 (FIG. 1). For example, packet destination 104 may include two numbers that represent a latitude 106 and longitude 108 of a desired destination of candidate packet 48' relative to earth 34 (FIG. 1).

In response to the receipt of packet destination 104 at task 102, a task 110 is performed. Task 110 causes coordinate translation element 50 (FIG. 3) of interference resolver 44 to produce a translation vector 112 (see FIG. 3) in response to packet destination 104. Translation vector 112 is a pointing angle relative to a center of FOV 26 (FIG. 1). Translation vector 112 defines the location of packet destination 104 relative to the center of FOV 26.

Referring back to FIG. 2 in connection with task 110, FOV 26 is shown having a center 114. Using latitude 106 and longitude 108 of packet destination 104 and knowing the location of FOV 26 at transmit time frame 58 (FIG. 2), an azimuth 116 and a beam angle 118 may be computed for each of keep out regions 37. In a preferred embodiment, latitude 106 and longitude 108 are converted to a circular coordinate system to obtain azimuth 116 and beam angle 118 relative to FOV 26.

Azimuth 116 is an angular distance of packet destination 104 measured clockwise relative to a north reference 120. In a preferred embodiment, azimuth 116 is defined in terms of ten degree increments.

Beam angle 118 is a desired angle between the selected one of transmission resources steered to packet destination 104 and center 114. As such, beam angle 118 describes a distance from center 114 to packet destination 104.

FOV 26 also shows a number of exemplary beam footprints 30 oriented in FOV 26 relative to azimuth 116 and beam angle 118. In other words, each of beam footprints 30 can be located in FOV 26 using azimuth 116 referenced from north reference 120 and beam angle 118 referenced from center 114.

With reference back to interference resolution process 84 (FIG. 4), task 110, translates azimuth 116 and beam angle 118 into translation vector 112 to obtain x-y coordinates corresponding to, or pointing to, bits 94 of cumulative keep out map 88 (FIG. 6).

Following task 110, a task 122 is performed. At task 122, target region profile element 52 (FIG. 3) utilizes azimuth 116 to obtain a target region profile 124 from a profile database of profiles maintained by interference resolver 44 (FIG. 3). The present invention dynamically provides correction in the steering of transmission resources 24, or beams, for complex factors such as earth elevation effects and communication platform altitude effects as transmission platform 22 (FIG. 1) moves relative to earth 34 without increasing processing time. The correction is provided by employing simple lookup tables, i.e. a profile database, as a function of the location and/or the altitude of transmission platform 22. The use of a profile database facilitates the addressing of real environment effects with precise corrections instead of coarse or no corrections based upon simple model approximation.

FIG. 7 shows a table of an exemplary profile database 126. Profile database 126 includes an azimuth field 128, a beam angle field 130, and a target region profile field 132.

Target region profile field 132 is subdivided into a left polarized field 134 and a right polarized field 136. Left polarized field 134 provides a first portion 138 of bit identifiers 95 describing a left polarization target region profile and a second portion 140 of bit identifiers 95 describing a right polarization target region profile for a left polarized one of transmission resources 24 (FIG. 1). Likewise, right polarized field 136 provides a first portion 142 of bit identifiers 95 describing a left polarization target region profile and a second portion 144 of bit identifiers 95 describing a right polarization target region profile for a right polarized one of transmission resources 24.

Profile database 126 is a table, or collection, of profiles, or transmission patterns, that may be indexed using azimuth 116 and beam angle 118 to obtain target region profile 124 (FIG. 5). For example, azimuth 116 of twenty degrees and beam angle 118 of zero to twenty-five degrees is indexed to obtain a left polarization target region profile 146 and a right polarization target region profile 148 from profile database 126 when the selected one of transmission resources 24 is left polarized.

The transmission patterns of profile database 126 can differ relative to azimuth 116 and beam angle 118. The differences may be due to a number of factors including oversizing of beam footprints 30 (FIG. 1) to accommodate continuous motion of communication platform 22 (FIG. 1), profile shape changes due to beam angles (i.e., beam shape changes from circular to elliptical based on beam angle 118 relative to center 114 (FIG. 2) of FOV 26), beam shape changes due to thermal and aging factors in the transmission equipment, and time varying changes relative to the attitude angles of communication platform 22.

The profiles may be shaped as ellipses, circles, rectangles, and so forth. However, the profiles are not limited to these shapes. Rather, the present invention advantageously allows the transmission patterns, or profiles, to be determined relative to an actual land use or terrain type of a particular location on earth 34 (FIG. 1) that may affect the reception of one of transmission resources 24. The profiles can be of any quantitative shape and may be determined through the collection of test data or through estimation.

The present invention advantageously supports the unrestrained shape of a radio frequency beam with no increase in processing time. Specifically, any beam transmission pattern of any complexity, such as can be measured or analyzed from a real application, can be used in place of the traditional ellipse or rectangle approximation used in prior art systems. The benefit of such an approach is improved interference calculation performance without the loss of utilization of transmission resources 24 (FIG. 3) incurred when making approximations of the beam pattern.

Task 122 (FIG. 5) is described in terms of indexing profile database 126 using azimuth 116 and beam angle 118 to obtain target region profile 124 (FIG. 5). However, the profiles may also be stored relative to beam angle 118, an altitude of communication platform 22 (FIG. 1) with respect to earth 34 (FIG. 1), and/or an elevation of earth 34 at packet destination 104 to obtain a more accurate target region profile.

Referring back to task 122 of process 84 (FIG. 5), since communication platform 22 (FIG. 1) utilizes a circular antenna system and left and right hand cross polarization scheme, task 122 returns left polarization target region profile 146 and right polarization target region profile 148 from profile database 126. In this exemplary scenario, the selected one of transmission resources 24, labeled "TRANS-MISSION RESOURCE 2" (FIG. 2), is a left polarized one of transmission resources 24, as such left polarization target region profile 128 is larger than right polarization target region profile 130. That is, right polarization target region profile 130 may be considered "cross-talk" on a second communication channel, or a right polarized one of transmission resources 24 (FIG. 1).

Following tasks 110 and 122, a task 150 is performed. At task 150, target region bitmap generator 54 (FIG. 2) of system 38 (FIG. 2) generates a target region bitmap using translation vector 112 (FIG. 2) and target region profile 124.

Figure 8:
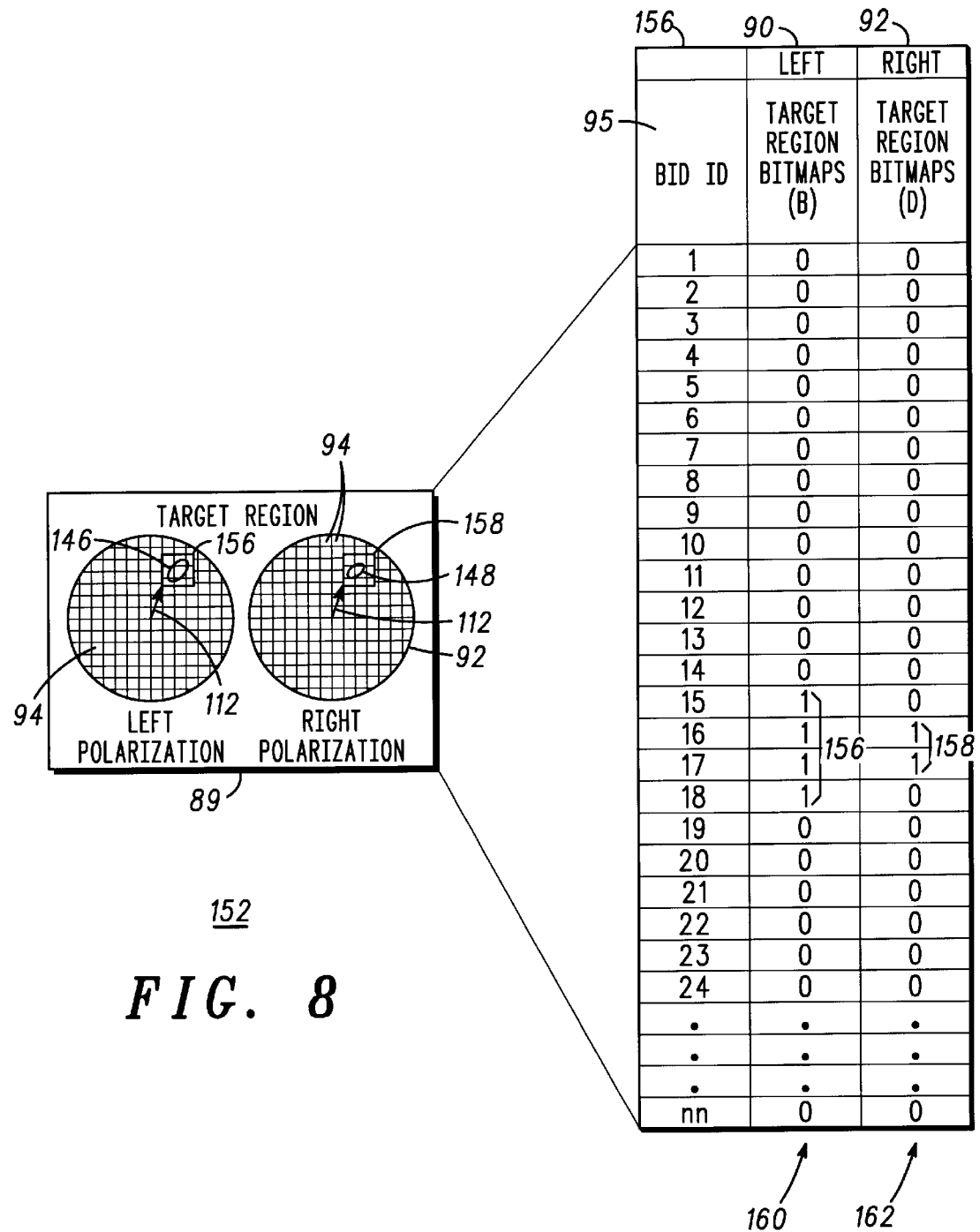
FIG. 8 shows a diagram of an exemplary target region bitmap.

FIG. 8 shows a diagram of an exemplary target region bitmap 152 generated in response to task 150. FIG. 8 represents target region bitmap 152 with a graphical representation 154 and a tabular representation 156 corresponding to cumulative keep out map 88 (FIG. 6). Using translation vector 112, left polarization target region profile 146 is mapped into first keep out map 90 to form a left target region bitmap 156. Likewise, right polarization target region profile 148 is mapped into second keep out map 92 to form a right target region bitmap 158.

Left target region bitmap 156 is also shown in a first column 160 of tabular representation by setting to "one" bit settings for bit identifiers 95, labeled 15, 16, 17, and 18. Likewise, right target region bitmap 158 is shown in a second column 162 of tabular representation by setting to "one" bit settings for bit identifiers 95, labeled 16 and 17.

Left and right target region bitmaps 156 and 158, respectively, represents a potential one of beam footprints 30 (FIG. 1) that would be produced if the selected one of transmission resources 24 was used to transmit candidate packet 48' during transmit time frame 58.

Referring back to interference resolution process 84 (FIG. 5), following task 150, a query task 164 is performed. At query task 164, interference calculator 56 (FIG. 3) of interference resolver 44 (FIG. 3) determines if left and right target region bitmaps 156 and 158, respectively, (FIG. 7) differ from all keep out regions 37 (FIG. 2) of cumulative keep out map 88 (FIG. 6).

FIG. 9 shows a table 166 of interference calculations performed by interference calculator 56 (FIG. 3) of system 38 (FIG. 3). Interference calculator 56 is implemented in hardware using a plurality of AND gates to quickly and efficiently compare bit settings corresponding to each of bit identifiers 95 of target region bitmap 152 (FIG. 7) with bit settings corresponding to bit identifiers 95 of cumulative keep out map 88 (FIG. 6). By using a plurality of AND gates, bit settings of target region bitmap 152 can be simultaneously compared with bit settings of cumulative keep out map 88.

A first set of AND gates evaluates bit settings identified by bit identifiers 95 for left polarization beam pattern 90. As shown in table 166, these AND gates are represented having an input (A) in a first column 168 from cumulative keep out map 88 (FIG. 6), an input (B) in a second column 170 from target region bitmap 152 (FIG. 8), and an output (Y) in a third column 172 for left polarization beam pattern 90. Likewise, a second set of AND gates evaluates bit settings identified by bit identifiers 95 for right polarization beam pattern 92. Again as shown in table 166, these AND gates are represented having an input (C) in a fourth column 174 from cumulative keep out map 88, an input (D) in a fifth column 176 from target region bitmap 152, and an output (Z) in a sixth column 178 for right polarization beam pattern 92.

At query task 164 (FIG. 5), interference calculator 56 (FIG. 3) verifies that all outputs of third column 172 are "zero" in order to determine that left target region bitmap 156 differs from all keep out regions 37 (FIG. 2) mapped into cumulative keep out map 88. Likewise, interference calculator 56 verifies that all outputs of sixth column 178 are "zero" indicating that right target region bitmap 158 differs from all keep out regions 37 mapped into cumulative keep out map 88.

During a first iteration of interference resolution process 84, all bits 94 of cumulative keep out map 88 (FIG. 6) were set to zero at task 86 (FIG. 5) since no candidate packets 48 (FIG. 3) were as of yet scheduled for transmission. Accordingly, during a first iteration of interference resolution process 84, query task 164 will determine that target region bitmap 152 differs from any keep out regions 37 of cumulative keep out map 88 and program control will proceed to a task 180. Thus, a positive response to query task 164 indicates that there is no contention in terms of resource allocation, spatial separation, and time separation between the selected one of candidate packets 48 and others of candidate packets 48 that were previously scheduled for transmission during transmit time frame 58.

However, in a subsequent iteration of process 84, when any bit settings in either of third column 172 and sixth column 178 are set to one, program control proceeds to a task 194 (discussed below). That is, a negative response to query task 164 indicates that there is contention in terms of resource allocation spatial separation, and time separation between the selected one of candidate packets 48 and others of candidate packets 48 that were previously scheduled for transmission during transmit time frame 58.

Referring to task 180, at task 180 interference calculator 44 schedules the selected one of candidate packets 48 for transmission during transmit time frame 58 using the selected one of transmission resources 24 (FIG. 1). For example, as shown in transmission schedule table 60 (FIG. 3), candidate packet 48', labeled P1, is scheduled for transmission during transmit time frame 58, labeled T1, using one of transmission resources 24, labeled TRANSMISSION RESOURCE 2. As such, candidate packet 48' is considered one of scheduled packets 70.

A task 182 is performed in response to task 180. At task 182, the assigned one of transmission resources 24 is marked as being occupied during transmit time frame 58. As shown in transmission schedule table 60, this "marking" is represented by a packet identifier, i.e., P1, being inserted into the appropriate field of the assigned one of transmission resources 24, labeled TRANSMISSION RESOURCE 2.

Following task 182, a task 184 is performed by cumulative keep out map generator 55 (FIG. 3) of interference resolver 44 (FIG. 3) to include target region bitmap 152 as a keep out region bitmap in cumulative keep out map 88. That is, the present invention employs a mechanism of superimposing keep out regions 37, onto cumulative keep out map 88 for determining interference between multiple transmission resources 24 (FIG. 1) against both time and spatial separation criteria. The use of superposition results in a packet scheduling performance improvement of approximately thirty two times greater than a conventional sequential packet scheduling approach.

Figure 10:
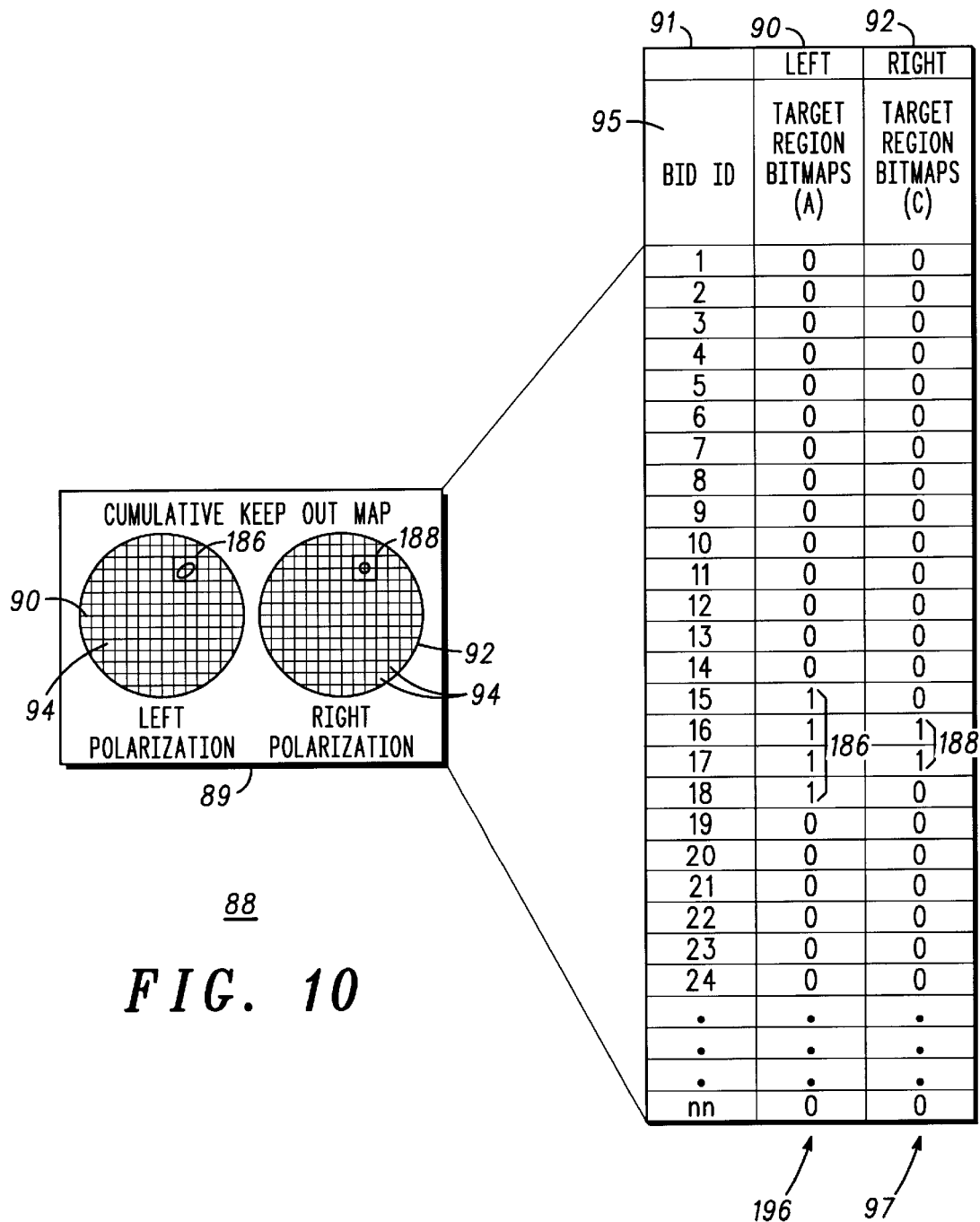
FIG. 10 shows a diagram of the cumulative keep out map including the target region bitmap of FIG. 8.

FIG. 10 shows a diagram of cumulative keep out map 88 updated to include left and right target regions 156 and 158, respectively. Like FIG. 6, cumulative keep out map 88 includes graphical representation 89 and tabular representation 91. However, now left target region bitmap 156 is mapped into first keep out map 90 of graphical representation 89 as one of keep out regions 37 (FIG. 2), specifically, a first keep out region 186. Likewise, right target region bitmap 158 is mapped into second keep out map 92 as one of keep out regions 37, specifically, a second keep out region 188.

First keep out region bitmap 186 is represented in first column 96 of tabular representation 91 by bit settings for identifiers 95, labeled 15, 16, 17, and 18, being set to "one". Likewise, second keep out region bitmap 188 is represented in second column 97 of tabular representation 91 by bit settings for bit identifiers 95, labeled 16 and 17, being set to "one". Cumulative keep out map 88, including left and right keep out bitmaps 186 and 188 will be used in a subsequent iteration of process 84 when evaluating a target region bitmap for a next one of candidate packets 48 (FIG. 3) in terms of spatial separation with scheduled packets 70 (FIG. 3).

Referring back to interference resolution process 84 (FIG. 5), following task 184, program control proceeds to a query task 190. At query task 190, interference resolver 44 (FIG. 3) determines if there is another one of transmission resources 24 (FIG. 1) to which one of candidate packets 48 may be assigned.

When there is another one of transmission resources 24, program control proceeds to a query task 192 to determine if there is another one of candidate packets 48 in candidate packet buffer 42 (FIG. 3). When there is another one of candidate packets 48, program control loops back to task 98 to repeat process 84 by selecting a next one of transmission resources 24 and selecting a next one of candidate packets 48 from candidate packet buffer 42.

However, when query task 190 determines that there is not another one of transmission resources 24 to which one of candidate packets 48 may be assigned, process 84 ends. Such a situation occurs when all of transmission resources 24 are assigned one of candidate packets 48 for transmission during transmit time frame 58.

Likewise, when query task 192 determines that there is not another one of candidate packets 48, process 84 ends. A net result of a negative response to query task 192, is that at least one of transmission resources 24 will not be scheduled to transmit one of candidate packets 48 during transmit time frame 58. Should such a situation arise, controller 66 (FIG. 3) may provide those transmission resources 24 with pointing data 68 that steers them away from any others of transmission resources 24 scheduled to transmit candidate packets 70 (FIG. 3) during transmit time frame 58.

Referring back to query task 164 of interference resolution process 84, as discussed previously when interference calculator 56 (FIG. 3) determines that target region bitmap 152 (FIG. 8) does not differ from all keep out region bitmaps of cumulative keep out map 88 (FIG. 6), program control proceeds to task 194. In other words, the selected one of candidate packets 48 was found to contend with one of candidate packets 48 previously scheduled for transmission during transmit time frame 58 as one of scheduled packets 70.

Figure 11:
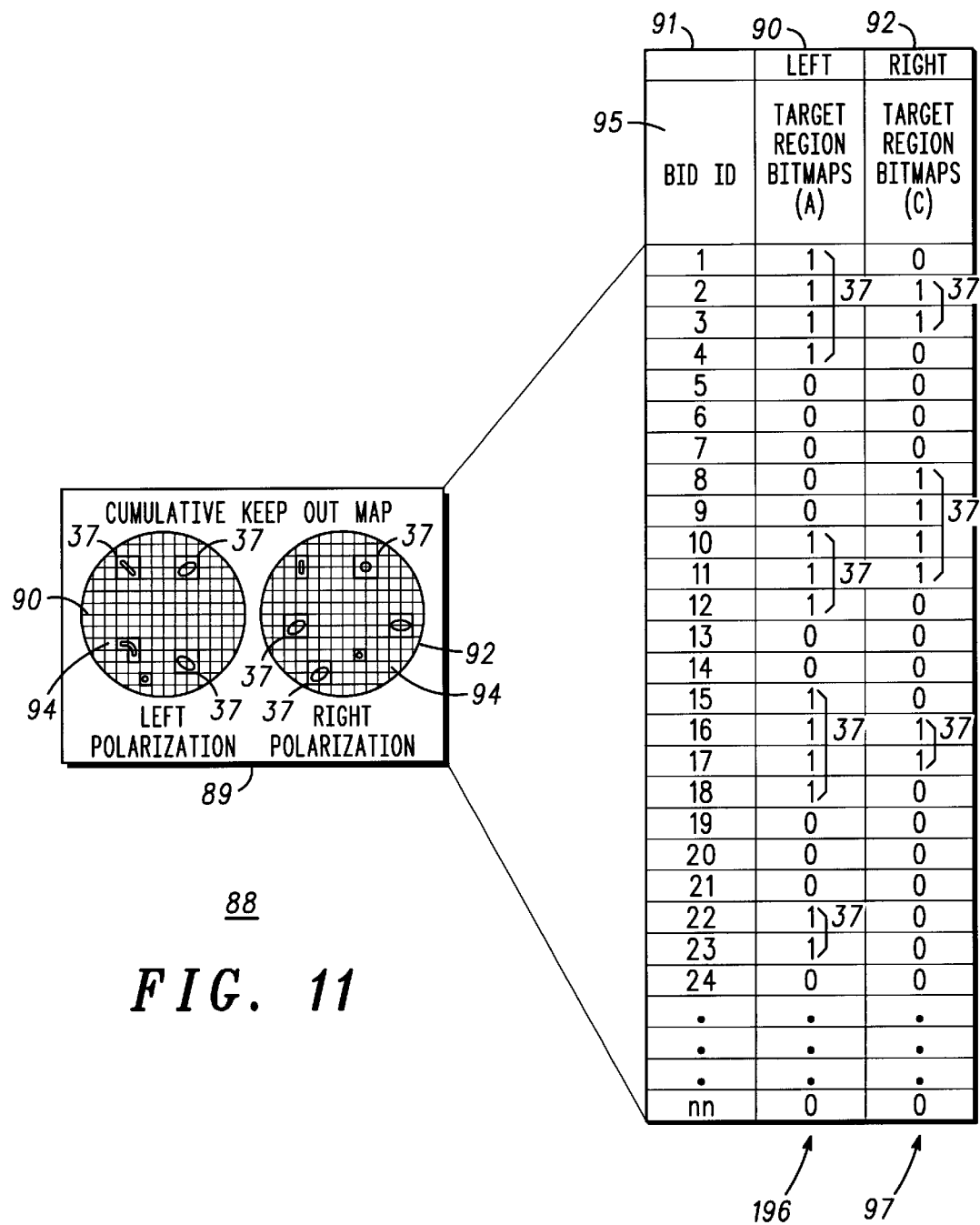
FIG. 11 shows a diagram of the cumulative keep out map updated through the iterative methodology of the process of FIG. 5 to include a number of keep out regions.

Referring to FIGS. 11–12, FIG. 11 shows a diagram of cumulative keep out map 88 updated through the iterative methodology of interference resolution process 84 (FIG. 5) to include a number of keep out regions 37 in both first keep out map 90 and second keep out map 92. Like FIGS. 6 and 10, cumulative keep out map 88 includes graphical representation 89 and tabular representation 91. Keep out regions 37 are keep out region bitmaps represented in each of first column 96 and second column 97 of tabular representation 91 by bit settings for identifiers 95 being set to "one".

FIG. 12 shows a table 198 of interference calculations performed by interference calculator 56 (FIG. 3) of system 38 (FIG. 3) during a subsequent iteration of interference resolution process 84 (FIG. 5). As described previously, the first set of AND gates evaluates bit settings for left polarization beam pattern 90 and the second set of AND gates evaluates bit settings for right polarization beam pattern 92. As shown in table 198, the first set of AND gates is shown having an input (A) in a first column 200, an input (B) in a second column 202, and an output (Y) in a third column, 204. Keep out regions 37 are represented by bit settings in first column 200, a left polarization target region bitmap 206 is represented by bit settings in second column 202, and the output of the first set of AND gates is shown in third column 204. Likewise, the second set of AND gates is shown having an input (C) in a fourth column 208, an input (B) in a fifth column 210, and an output (Y) in a sixth column 212. Keep out regions 37 are represented by bit settings in fourth column 208, a right polarization target region bitmap 214 is represented by bit settings in fifth column 210, and the output of the second set of AND gates is shown in sixth column 212.

At query task 164 (FIG. 5), interference calculator 56 (FIG. 3) determines whether left and right polarization target region bitmaps 206 and 214, respectively, differ from all of keep out regions 37. In other words, if any bit settings in either of third column 204 and sixth column 212 are "one", left and/or right polarization target region bitmaps 206 and 214 do not differ from all of keep out regions 37. That is, if the selected one of candidate packets 48 was to be scheduled for transmission during transmit time frame 58 using the selected one of transmission resources 24 (FIG. 2), it's destination would contend with a destination of one of scheduled packets 70. This contention between packets is shown by bit settings of "one" in either of third column 204 and/or sixth column 212.

Referring back to task 194 (FIG. 5) of interference resolution process 84, at task 194 the selected one of candidate packets 48 is retained in candidate packet buffer 42 (FIG. 2) during transmit time frame 58. In other words, the selected one of candidate packets 48 was found to contend with scheduled packets 70 (FIG. 3) and will not be scheduled for transmission during transmit time frame 58. Following task 194 of process 84, program control proceeds to a task 216.

At task 216, interference resolver 44 (FIG. 3) sets transmission priority 77 of the selected one of candidate packets 48 as a highest transmission priority for a next transmit time frame 58. Task 216 is performed to ensure that the selected one of candidate packets 48, retained in candidate packet buffer 42 at task 194, is selected for transmission during a subsequent transmit time frame 58 in accordance with oldest out first methodology. The delay in transmission of the selected one of candidate packets 48 until a next transmit time frame 58 allows for higher utilization of all of transmission resources 24 without undesirably compromising QOS in terms of latency, or delay, experienced by the selected one of candidate packets 48 retained in candidate packet buffer 42 at task 194.

Following task 216, process 84 proceeds to query task 192 to determine if there is another one of candidate packets 48 in candidate packet buffer 42 (FIG. 3). In other words, since the selected one of candidate packets 48 is being retained in candidate packet buffer 42 at task 194, the selected one of transmission resources 24 is still available. As such, interference resolver 44 (FIG. 2) attempts to schedule a next one of candidate packets 48 from candidate packet buffer 42 for transmission during transmit time frame.

Again, if there are no more candidate packets 48 in candidate packet buffer, process 84 ends. Process 84 is repeated during each iteration of packet scheduling process 72 (FIG. 4). Through the use of a graphical processing engine that utilizes parallel processing, interference resolution process 84 is executed during a duration of a single transmit time frame to efficiently schedule packets for transmission.

In summary, the present invention teaches of a system and method for scheduling transmission of packets from a communication platform. The system and method first perform quality-of-service (QOS) processing to ensure that QOS is treated with the highest priority. In addition, the system and method efficiently consider spatial separation, time separation, and transmission resource allocation concurrently through the utilization of an interference resolver that implements a single cycle parallel graphical processing engine that utilizes simple ASIC internal memory addressing binary processing.

Although the preferred embodiments of the invention have been illustrated and described in detail, it will be readily apparent to those skilled in the art that various modifications may be made therein without departing from the spirit of the invention or from the scope of the appended claims. For example, those skilled in the art will appreciate that the present invention will accommodate a wide variation in the specific tasks and the specific task ordering used to accomplish the processes described herein.

What is claimed is:

1. A method for scheduling transmission of a packet from a communication platform, said communication platform being allocated a plurality of transmission resources, said method comprising steps of establishing a transmission priority for said packet;

selecting said packet in response to said transmission priority;

assigning said packet to a candidate transmission resource, said candidate transmission resource being one of said plurality of transmission resources;

comparing a target region for transmission of said packet to keep out regions represented in a cumulative keep out map established for a transmit time frame; and when said target region differs from said keep out regions, scheduling said packet for transmission during said transmit time frame using said candidate transmission resource.

2. A method as claimed in claim 1 wherein:

said transmission priority establishes an allowable period of transmission time delay for said packet; and said transmit time frame is one of a number of potential transmit time frames in said allowable period of transmission time delay such that said packet can be scheduled for transmission during any of said potential transmit time frames to prevent violation of said transmission priority.

3. A method as claimed in claim 1 wherein said establishing step comprises:

determining a data type of said packet; and designating said transmission priority in response to a desired quality of service for said data type.

4. A method as claimed in claim 1 wherein:

said method further comprises storing said packet in a candidate packet buffer following said establishing step and said selecting operation selects said packet from a plurality of packets stored in said candidate packet buffer.

5. A method as claimed in claim 1 wherein:
said packet is one of a plurality of packets;
said establishing step establishes transmission priorities for each of said packets of said plurality of packets; and
said selecting step includes determining said one packet has a higher one of said transmission priorities than said transmission priorities of remaining ones of said plurality of packets.

6. A method as claimed in claim 1 wherein said packet is one of a plurality of packets, and said method further comprises performing said assigning, comparing, and scheduling operations for each of said transmission resources during a scheduling duration using others of said plurality of packets.

7. A method as claimed in claim 6 wherein said scheduling duration is substantially equivalent to a duration of said transmit time frame.

8. A method as claimed in claim 1 further comprising:
storing said packet in a candidate packet buffer prior to said selecting step
determining, in response to said comparing step, that said target region overlaps one of said keep out regions represented in said cumulative keep out map; and
retaining said packet in said candidate packet buffer in response to said determining step.

9. A method as claimed in claim 8 wherein said method further comprises:
selecting, in response to said retaining step, a next one of said packets from said candidate buffer; and
performing said assigning and comparing operations to determine whether said next one of said packets is to be scheduled for transmission during said transmit time frame using said candidate transmission resource.

10. A method as claimed in claim 8 wherein following said retaining step said method further comprises repeating said selecting, assigning, and comparing step to schedule said packet for transmission during a next transmit time frame.

11. A method as claimed in claim 10 wherein said packet is a first packet and said method further comprises:
determining said candidate packet buffer includes a second packet; and
performing said repeating step for said first packet prior to performing said selecting, assigning, and comparing step for said second packet.

12. A method as claimed in claim 1 wherein:
said plurality of transmission resources are transmission beams exhibiting a first transmission discriminator and a second transmission discriminator;
said method further comprises:
establishing a first keep out map of said cumulative keep out map, said first keep out map being responsive to said first discriminator and having first discriminator keep out regions;
establishing a second keep out map of said cumulative keep out map, said second keep out map being responsive to said second discriminator and having second discriminator keep out regions;
determining a first portion of said target region responsive to said first discriminator; and
determining a second portion of said target region responsive to said second discriminator; and
said comparing operation comprises:
verifying that said first portion differs from said first discriminator keep out regions; and
verifying that said second portion differs from said second discriminator keep out regions.

13. A method as claimed in claim 12 wherein:
said first discriminator is a right polarization beam pattern; and
said second discriminator is a left polarization beam pattern.

14. A method as claimed in claim 12 wherein:
said first discriminator is a first transmission frequency; and
said second discriminator is a second transmission frequency.

15. A method as claimed in claim 1 wherein said comparing step comprises:
extracting a packet destination from said selected packet;
producing a translation vector in response to said packet destination;
obtaining a target region profile from a profile database in response to said packet destination; and
generating said target region in response to said translation vector and said target region profile.

16. A method as claimed in claim 15 wherein said target region profile exhibits one of a plurality of transmission patterns.

17. A method as claimed in claim 15 wherein said producing step comprises:
computing an azimuth and a beam angle relative to said communication platform for said packet destination; and
using said azimuth and said beam angle to obtain coordinates of said translation vector that describe a location of said target region profile for generating said target region relative to said cumulative keep out map.

18. A method as claimed in claim 15 wherein said obtaining operation comprises:
computing an azimuth for said packet destination relative to said communication platform; and
accessing said profile database using said azimuth to obtain said target region profile.

19. A method as claimed in claim 18 wherein:
said obtaining operation further comprises computing a beam angle for said packet destination relative to said communication platform; and
said accessing operation accesses said profile database using both of said azimuth and said beam angle to obtain said target region profile.

20. A method as claimed in claim 1 wherein said scheduling operation includes marking said candidate transmission resource as being occupied during said transmit time frame.

21. A method as claimed in claim 1 further comprising including said target region as an additional one of said keep out regions in said cumulative keep out map in response to said scheduling operation.

22. A system for scheduling packets for transmission from a communication platform, said communication platform being allocated a plurality of transmission resources, and said system comprising:
a processing element for receiving said packets, said processing element establishing a transmission priority for each of said packets according to a desired quality of service for said each packet;
a candidate packet buffer for receiving ones of said packets from said processing element in accordance with said transmission priority;

a profile database having a plurality of target region profiles describing transmission patterns of said transmission resources; and an interference resolver configured to perform operations including:
- establishing a cumulative keep out map of keep out regions for a transmit time frame;
- selecting one of said packets from said candidate packet buffer in response to said transmission priority;
- assigning said packet to a candidate transmission resource, said candidate transmission resource being one of said plurality of transmission resources;
- extracting a packet destination from said one packet;
- obtaining a target region profile from said profile database in response to said packet destination;
- generating a target region in response to said target region profile;
- when said target region differs from said keep out regions of said cumulative keep out map, scheduling said one packet for transmission during said transmit time frame using said candidate transmission resource; and
- when said target region overlaps one of said keep out regions of said cumulative keep out map, retaining said packet in said candidate packet buffer.

23. A system as claimed in claim 22 wherein said profile database comprises a plurality of azimuth entries, said target region profiles being associated with particular ones of said azimuth entries.

24. A system as claimed in claim 23 wherein said profile database further comprises a plurality of beam angle entries characterizing a distance from a center of a field of view of said communication platform, said azimuth entries being associated with ones of said elevation angle entries, and one of said target region profiles is obtained in response to a particular pair of said azimuth and beam angle entries.

25. A system as claimed in claim 22 wherein:
said plurality of transmission resources are transmission beams exhibiting a left polarization beam pattern and a right polarization beam pattern;
said profile database includes a left polarization target region profile and a right polarization target region profile; and
said cumulative keep out map includes a left polarization keep out map of left keep out regions and a right polarization keep out map of right keep out regions; and
said interference resolver performs further operations including:
- obtaining one of said left polarization target region profiles and one of said right polarization target region profiles in response to said packet destination;
- generating a left polarization target region in response to said one of said left polarization target region profile and a right polarization target region in response to said one of said right polarization target region profile; and
- verifying that said one left polarization target region profile differs from said left keep out regions and said one right polarization target region profile differs from said right keep out regions.

26. A system as claimed in claim 22 wherein:
each of said target region profiles is described by a target region bitmap;
said keep out regions of said cumulative keep out map are described by keep out region bitmaps; and
said interference resolver concurrently compares bits of said target region bitmap with bits of said keep out region bitmaps to determine whether said target region differs from said keep out regions.

27. A system as claimed in claim 22 wherein in response to said retaining operation, said interference resolver performs a further operation of attempting to schedule said one packet for transmission during a next time frame prior to scheduling others of said packets in said candidate packet buffer for transmission in said next time frame.

28. A system as claimed in claim 22 wherein said interference resolver performs a further operation of including said target region as an additional one of said keep out regions in said cumulative keep out map in response to said scheduling operation.

29. A method for scheduling transmission of packets from a communication platform, said communication platform being allocated a plurality of transmission beams, said method comprising:
- establishing a transmission priority for one of said packets in response to a desired quality of service for a data type of said one packet;
- selecting said one packet in response to said transmission priority;
- establishing a cumulative keep out map of keep out regions for a transmit time frame, said keep out regions being described by keep out region bitmaps;
- assigning said packet to a candidate transmission resource, said candidate transmission resource being one of said plurality of transmission resources;
- extracting a packet destination from said one packet;
- producing a translation vector in response to said packet destination;
- obtaining a target region profile from a profile database in response to said packet destination;
- generating a target region bitmap in response to said translation vector and said target region profile;
- comparing said target region bitmap with said keep out region bitmaps;
- when all bits of said target region bitmap differ from all bits of said keep out region bitmaps, scheduling said one packet for transmission during said transmit time frame using said candidate transmission resource; and
- including said target region bitmap as an additional one of said keep out region bitmaps in said cumulative keep out map in response to said scheduling operation.

30. A method as claimed in claim 29 further comprising performing said method to schedule ones of said packets for transmission during said transmit time frame using others of said transmission beams.

* * * * *

UNITED STATES PATENT AND TRADEMARK OFFICE
CERTIFICATE OF CORRECTION

PATENT NO. : 6,888,806 B1 Page 1 of 1
APPLICATION NO. : 09/721238
DATED : May 3, 2005
INVENTOR(S) : Karl E. Miller et al.

It is certified that error appears in the above-identified patent and that said Letters Patent is hereby corrected as shown below:

Column 16,
Line 66, change "operation" to -- step --.

Column 17,
Line 30, change "said" to -- a plurality of --.
Line 32, after second occurrence of "said" add -- plurality of --.

Column 18,
Line 60, after "comprising" add -- steps of --.

Column 19,
Lines 4 and 50, change "operations" to -- steps --.

Column 20,
Lines 13, 14, 22 and 55, change "operation" to -- step --.

Signed and Sealed this

Eleventh Day of July, 2006

JON W. DUDAS
*Director of the United States Patent and Trademark Office*